United States Patent
Kowarsch et al.

(10) Patent No.: US 10,287,435 B2
(45) Date of Patent: May 14, 2019

(54) PREPARATION OF PIGMENT RED 149

(75) Inventors: Heinrich Kowarsch, Oberderdingen (DE); Josef Hetzenegger, Birkenheide (DE); Andreas Stohr, Freinsheim (DE); Hans-Joachim Uschmann, Schwetzingen (DE)

(73) Assignee: BASF SE, Ludwigshafen (DE)

( * ) Notice: Subject to any disclaimer, the term of this patent is extended or adjusted under 35 U.S.C. 154(b) by 1590 days.

(21) Appl. No.: 12/527,706

(22) PCT Filed: Feb. 18, 2008

(86) PCT No.: PCT/EP2008/051932
§ 371 (c)(1),
(2), (4) Date: Aug. 19, 2009

(87) PCT Pub. No.: WO2008/101895
PCT Pub. Date: Aug. 28, 2008

(65) Prior Publication Data
US 2010/0063288 A1 Mar. 11, 2010

(30) Foreign Application Priority Data
Feb. 19, 2007 (EP) .................................... 07102654

(51) Int. Cl.
C09B 5/62 (2006.01)
C09B 67/04 (2006.01)
C09B 67/18 (2006.01)
C09B 67/00 (2006.01)
C09B 67/48 (2006.01)

(52) U.S. Cl.
CPC ............ *C09B 5/62* (2013.01); *C09B 67/0002* (2013.01); *C09B 67/002* (2013.01); *C09B 67/0022* (2013.01); *C09B 67/0025* (2013.01)

(58) Field of Classification Search
CPC ...................................................... C09B 5/62
See application file for complete search history.

(56) References Cited

U.S. PATENT DOCUMENTS

| | | | |
|---|---|---|---|
| 4,831,140 A * | 5/1989 | Spietschka et al. | 546/37 |
| 5,626,662 A * | 5/1997 | Urban | 106/497 |
| 5,650,513 A | 7/1997 | Langhals et al. | |
| 6,391,104 B1 * | 5/2002 | Schulz | 106/494 |
| 2001/0047740 A1 | 12/2001 | Wada et al. | |
| 2002/0065402 A1 | 5/2002 | Jung et al. | |
| 2003/0152500 A1 * | 8/2003 | Dalziel et al. | 422/245.1 |
| 2007/0020409 A1 | 1/2007 | Feldhues et al. | |

FOREIGN PATENT DOCUMENTS

| | | |
|---|---|---|
| CN | 1310203 | 8/2001 |
| DE | 1 807 729 | 6/1970 |
| DE | 2 210 170 | 9/1973 |
| DE | 10 2005 033 580 | 1/2007 |
| EP | 0 198 369 | 10/1986 |
| EP | 0 657 436 | 6/1995 |
| EP | 1 130 065 | 9/2001 |
| EP | 1 188 800 | 3/2002 |
| EP | 1 528 084 | 5/2005 |
| JP | 57 149 358 | 9/1982 |

OTHER PUBLICATIONS

Paul et. al. "Organic crystallization processes" Powder Technology 150 (2005) 133-143.*
Frank Wurthner "Preparation and Characterization of Regioisomerically Pure 1,7-Disubstituted Perylene Bisimide Dyes" J. Org. Chem. 2004, 69, 7933-7939.*
Segev "Environmental Impact of Flame Retardants (Persistence and Biodegradability)" International Journal of Environmental Research and Public Health Jun. 2009, 478-491.*
Herbst "Industrial Organic Pigments Production, Properties, Applications" Third, Completely Revised Edition Wiley-VCH: Weinheim 2004, pp. 474-477.*
Wolska "Soluble Polycyclic Dyes" Dyes, Auxiliary Products 2002, 46, 15-26 (English translation attached).*
Wescott "Donor-sigma-Acceptor Molecules Incorporating a Nonadecyl-Swallowtailed Perylenediimide Acceptor" J. Org. Chem. 2005, 70, 8956-8962.*
Nagao Bull. Chem. Soc. Jpn. 1981, 54, 1191-1194.*

* cited by examiner

*Primary Examiner* — David K O'Dell
(74) *Attorney, Agent, or Firm* — Oblon, McClelland, Maier & Neustadt, L.L.P.

(57) ABSTRACT

The invention provides a process for preparing N,N'-di(3',5'-dimethylphenyl)perylene bis(dicarboximide), and other pigments having modified properties, by reaction of perylene-3,4,9,10-tetracarboxylic dianhydride with 3,5-dimethylaniline, or a mixture of 3,5-dimethyl aniline and at least one other primary amine, in the presence of a secondary amine or tertiary amine as catalyst, wherein the reaction occurs in an aqueous reaction medium and in the presence of added seed crystals of N,N'-di(3',5'-dimethylphenyl)perylenebis(dicarboximide), such that the aqueous medium is present at the beginning of the reaction.

14 Claims, No Drawings

PREPARATION OF PIGMENT RED 149

BACKGROUND OF THE INVENTION

The present invention relates to a process for preparing N,N'-di(3',5'-dimethylphenyl) perylenebis(dicarboximide) (=C.I. Pigment Red 149).

It is known to prepare colorants of the perylene-3,4,9,10-tetracarboxylic diimide series by reacting perylene-3,4,9,10-tetracarboxylic dianhydride with primary arylamines.

Pigment Red 149 has the following formula:

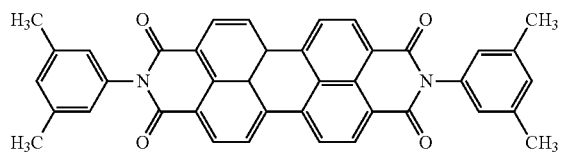

The O-semicondensate has the following formula:

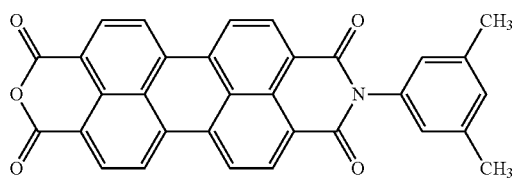 [SMILES: Cc1cc(C)cc(N2C(=O)c3ccc4c5ccc6c7c(ccc(c8ccc(c3c48)C2=O)c75)C(=O)OC6=O)c1]

DE-A 1 807 729 discloses the reaction of perylenetetracarboxylic acid or anhydride with 3,5-dichloroaniline in the presence of condensation-accelerating agents, such as zinc chloride, zinc acetate or hydrochloric acid, in solvent or diluent media such as quinoline, quinaldine, naphthalene or trichlorobenzene. The dye is isolated from the reaction mixture by filtration, if appropriate after dilution of the reaction mixture with inert solvents such as alcohols, formamide, dimethylformamide, toluene, chlorobenzene or nitrobenzene, and subsequent washing with organic solvents and water. To remove any traces of perylenetetracarboxylic acid, the dye is decocted with dilute aqueous sodium hydroxide solution. Subsequently, the dye is converted into a useful pigmentary crystal form by dissolving in concentrated sulfuric acid and precipitating by dilution with water.

DE-A 2 210 170 discloses a corresponding process wherein perylene-3,4,9,10-tetracarboxylic acid is reacted with 2,4,6-trimethylaniline.

However, the use of acidic condensing assistants means disadvantages such as corrosion problems and losses in relation to the costly, in some instances, amine components due to secondary reactions.

EP-A 0 198 369 discloses a process for preparing arylimides of perylene-3,4,9,10-tetracarboxylic acid wherein perylene-3,4,9,10-tetracarboxylic dianhydride (perylenebisanhydride) is reacted with a primary arylamine in the presence of a dialkylamine as catalyst. The reaction can take place in the presence of inert diluents, such as dimethylformamide, N-methylpyrrolidone, o-dichlorobenzene, nitrobenzene, quinoline or 2-ethylhexanol. Preferably, however, the reaction is carried out without further diluent in the relevant mixture of arylamine and dialkylamine. The reaction product can be removed, if appropriate after dilution with a low-boiling alcohol, by filtration. Preferably, however, the mixture of excess arylamine and dialkylamine and, if appropriate, the inert diluent is distillatively removed after quantitative conversion, so that the reaction product remains behind as a dry residue.

CN-A 1310203 discloses a process for preparing perylenetetracarboxylic diimide pigments wherein perylenebisanhydride and primary amine is reacted in aqueous solution at a pH of 3 to 5 in the presence of an organic carboxylic acid having 1 to 6 carbon atoms. The crude pigment is subsequently subjected to an aftertreatment (finishing). To this end, the crude pigment is ball milled in the presence of a grinding assistant such as sodium chloride, sodium sulfate and sodium carbonate, an organic solvent and 1% to 5% by weight, based on the weight of the crude pigment, of a perylenetetracarboxylic diimide derivative. Subsequently, a post-finishing treatment is carried out in an aqueous medium in the presence of a surfactant.

In the examples, perylenebisanhydride is dissolved in 10% KOH solution, and 3,5-dimethylaniline and acetic acid are added to the solution. The reaction product is filtered off and washed neutral with water. The dried crude pigment is subsequently ball milled with sodium chloride, a small amount of N,N'-di-n-butylperylenebis(dicarboximide) and a xylene-ethyl acetate mixture. The mixture is finally transferred into a 2% by weight aqueous hydrochloric acid comprising 1% of a surfactant mixture, boiled, the pigment is filtered off, washed neutral with water, dried and comminuted.

One disadvantage with the process described in CN-A 1310203 is that the perylenebisanhydride has to be initially completely dissolved in aqueous potassium hydroxide solution and subsequently reprecipitated in finely divided form with acetic acid. This consumes appreciable amounts of acetic acid, which cannot be recovered. Moreover, some of the costly 3,5-dimethylaniline is lost by acylation. The dye obtained does not meet quality requirements and has to be inconveniently aftertreated in several finishing operations.

It is an object of the present invention to provide a simple process for preparing Pigment Red 149 without the disadvantages described above.

BRIEF SUMMARY OF THE INVENTION

We have found that this object is achieved by a process for preparing N,N'-di(3',5'-dimethylphenyl) perylenebis(dicarboximide) by reaction of perylene-3,4,9,10-tetracarbcoxylic dianhydride (perylenebisanhydride) with 3,5-dimethylaniline in the presence of a secondary or tertiary amine as catalyst, which comprises effecting the reaction in an aqueous reaction medium and in the presence of added seed crystals of N,N'-di(3',5'-dimethylphenyl)perylenebis(dicarboximide). More particularly, the aqueous reaction medium comprises no further organic solvents at all. Certain amounts of inert, water-miscible organic solvents, for example up to 10% by weight, can be present, however. Similarly, surface-active agents, for example the ethoxylation products of long-chain alcohols or the ethoxylation products of alkylphenols, can optionally be added.

DETAILED DESCRIPTION OF THE INVENTION

The reaction is preferably carried out in a purely aqueous reaction medium comprising essentially no further organic solvents.

The reaction is carried out in the presence of a secondary or tertiary amine as catalyst. Useful catalysts include aliphatic, cycloaliphatic, arylaliphatic or heterocyclic secondary or tertiary amines. In general, useful secondary amines have the formula R'R"NH, where R' and R" may be the same or different and may each be a straight-chain or branched alkyl or cycloalkyl of 1 to 6 carbon atoms, with or without hydroxyl, alkoxy, alkyl, alkylamino or aryl substitution, or where R' and R" combine with the nitrogen atom to form a 5- or 6-membered heterocyclic ring which can be substituted if appropriate (in the case of tertiary amines) by alkyl, aralkyl or aryl groups. Useful tertiary amines generally comprise 3 of the radicals mentioned.

Preferred secondary or tertiary amines are piperazine, N-(2-hydroxyethyl)piperazine, diethanolamine, N,N'-dimethylpiperazine, N-ethylpiperazine, N-methylcyclohexylamine, imidazole and N-methyimidazole.

The reaction is carried out in the presence of seed crystals of C.I. Pigment Red 149. The amount of seed crystals added is in the range from 1% to 25% by weight and preferably in the range from 5% to 10% by weight, based on the reaction product. The seed crystals added can come from one of the preceding charges.

The reaction is generally carried out at a temperature of 120 to 190° C. and a pressure of 2 to 13 bar. The reaction time is generally in the range from 5 to 40 hours. The molar ratio of 3,5-dimethylaniline to perylenebisanhydride is generally in the range from 1.8:1 to 4:1 and preferably in the range from 2:1 to 3:1. The molar ratio of secondary or tertiary amine to perylenebisanhydride is generally in the range from 0.5:1 to 2:1 and preferably in the range from 0.8:1 to 1.4:1. Excess 3,5-dimethylaniline can be distilled off after the reaction has ended. The reaction product, C.I. Pigment Red 149, is generally covered by filtration. The mother liquor comprising the secondary or tertiary amine can subsequently be reused as reaction medium to synthesize further Pigment Red 149.

If desired, up to 10% by weight and preferably up to 5% by weight, for example 0.5 to 5% by weight, of the 3,5-xylidine can be replaced by some other primary amine in the preparation process described in order that pigments having modified properties may be obtained. Useful further primary amines include for example 4-methoxyaniline and 4-ethoxyaniline.

The process of the present invention provides Pigment Red 149 in the alpha form. Generally, it comprises less than 5% by weight and preferably less than 1.5% by weight of the monoimide.

Filtration preferably provides the product in the form of a 30-50% by weight press cake.

The coarsely crystalline pigment is generally converted into a suitable particle size by means of customary fine division and finishing processes before its use in coatings and plastics. Generally, one dry- or wet-grinding operation will be sufficient for this purpose, if appropriate with subsequent controlled recrystallization from solvents, for example water or aqueous-organic solvent mixtures. This converts the Pigment Red 149 to particles having a size of generally <0.2 μm.

The pigment provides strong reds of high cleanness of hue and good thermal stability when used for coloration of macromolecular material, for example PVC, LDPE, HDPE, polypropylene or polyamide.

The examples which follow illustrate the invention.

EXAMPLES

Example 1

An autoclave is charged with 423 g of perylenebisanhydride as 50% by weight water-moist press cake, corresponding to 0.54 mol, 940 g of water, 44 g piperazine, corresponding to 0.51 mol, and 18 g of Pigment Red 149 as seed crystals, and this initial charge is efficiently stirred. After addition of 156 g of 3,5-dimethylaniline, corresponding to 1.29 mol, the batch is heated to 145° C. and stirred at 145° C. for 15 hours. The autoclave is subsequently let down and the excess xylidine is completely distilled off.

The batch is filtered and washed colorless. The yield of Pigment Red 149 is 311 g, corresponding to 96.4% of theory.

The crude product thus obtained comprises 97.5% by weight of the perylenediimide and 1.4% by weight of the monoimide (O-semicondensate). The product is present in the alpha form.

30 g of pigment, 60 g (90 g) of sodium chloride and 750 g of steel balls are ball milled at 80° C. for 20 h. Subsequently, the millbase is stirred up in water and in the presence of 2 g of hydrochloric acid, washed salt-free, dried and ground.

The pigment obtained provides a very strong color when judged in accordance with DIN EN 139900-3 on incorporation in LDPE (Low Density Polyethylene) and provides colorations having high cleanness of hue coupled with good thermal stability.

Comparative Example

If no seed crystals are added, a weak-colored, dull Pigment Red 149 is obtained and it moreover still contains 5% of O-semicondensate. It further comprises portions of the undesired beta- and gamma-forms.

TABLE

| | Coloristics in LDPE white reduction | | |
| --- | --- | --- | --- |
| | Color strength in % | Hue dH* | Chroma dC* |
| Example 1 | 100 | 0 | 0 |
| Comparative example | 82 | 0.7 | −1.7 |

*dH and dC = hue difference and chroma difference, respectively, between comparative example and inventive example after color strength equalization in accordance with DIN 6174

Example 2

Example 1 is repeated except that 66 g of N-(2-hydroxyethyl)piperazine, corresponding to 0.51 mol, are used as secondary amine. The yield of crude product is 304 g, corresponding to 94.2% of theory.

Example 3

Example 1 is repeated except that 100 parts by weight of 80% pure diethanolamine, corresponding to 0.76 mol, are used as secondary amine. The yield of crude product is 313 g, corresponding to 97.0% of theory.

We claim:

1. A process for preparing N,N'-di(3',5'-dimethyl phenyl) perylenebis(dicarboximide), the process comprising reacting perylene-3,4,9,10-tetra carboxylic dianhydride with 3,5-dimethylaniline in the presence of a secondary amine as catalyst, wherein:
   a molar ratio between the 3,5-dimethylaniline and the perylene-3,4,9,10-tetracarboxylic dianhydride ranges from 2:1 to 3:1;
   the reaction occurs in an aqueous reaction medium and in the presence of added seed crystals of N,N'-di(3',5'- dimethylphenyl) perylenebis(dicarboximide), wherein the seed crystals are present prior to the beginning of the reaction;

the aqueous reaction medium is present at the beginning of the reaction;

the reaction occurs at a temperature in the range from 130° C. to 170° C. and at a pressure in the range from 2 bar to 13 bar; and the process provides Pigment Red 149 in the alpha form, such that the Pigment Red 149 comprises less than 5% by weight of a monoimide by-product.

2. The process according to claim 1, wherein the aqueous reaction medium comprises no further organic solvents.

3. The process according to claim 1, wherein the secondary amine is selected from the group consisting of piperazine, N-(2-hydroxyethyl) piperazine, diethanolamine, N-ethylpiperazine, N-methylcyclohexylamine, imidazole and N-methylimidazole.

4. The process according to claim 1, wherein the seed crystals are obtained from at least one preceding charge.

5. The process according to claim 1, wherein aqueous reaction medium remaining after a reaction product is filtered off is reused in the preparation of a subsequent charge.

6. The process according to claim 1, wherein 0.5 to 2.0 mol of the secondary amine are used per mole of the perylene-3,4,9,10-dicarboxylic dianhydride.

7. A process for preparing a perylenebis(dicarboximide), the process comprising reacting perylene-3,4,9,10-tetracarboxylic dianhydride with a primary amine mixture in the presence of a secondary amine as catalyst, wherein the reaction occurs in an aqueous reaction medium and in the presence of added seed crystals of N,N'-di(3',5'-dimethylphenyl) perylenebis-(dicarboximide), wherein the seed crystals are present prior to the beginning of the reaction, wherein:

the aqueous reaction medium is present at the beginning of the reaction;

the primary amine mixture comprises 3,5-dimethylaniline and 0% to 10% by weight of a primary amine, based on a total weight of the primary amine mixture;

the reaction occurs at a temperature in the range from 130° C. to 170° C. and at a pressure in the range from 2 bar to 13 bar; and a molar ratio between the 3,5-dimethylaniline and the perylene-3,4,9,10-tetracarboxylic dianhydride ranges from 2:1 to 3:1.

8. The process according to claim 1, further comprising converting the N,N'-di(3',5'-imethylphenyl)perylenebis(dicarboximide) into particles having an average size <0.2 µm by at least one of dry and wet grinding, optionally with subsequent recrystallization from a solvent.

9. The process according to claim 7, wherein the aqueous reaction medium comprises no further organic solvents.

10. The process according to claim 7, wherein aqueous reaction medium remaining after a reaction product is filtered off is reused in the preparation of a subsequent charge.

11. A process for preparing a perylenebis(dicarboximide), the process comprising reacting perylene-3,4,9,10-tetracarboxylic dianhydride with a primary amine mixture in the presence of a tertiary amine, wherein:

the reaction occurs in an aqueous reaction medium and in the presence of added seed crystals of N,N'-di(3',5'-dimethylphenyl) perylenebis(dicarboximide), wherein the seed crystals are present prior to the beginning of the reaction;

the aqueous reaction medium is present at the beginning of the reaction;

the primary amine mixture comprises 3,5-dimethylaniline and 0% to 10% by weight of a primary amine, based on a total weight of the primary amine mixture;

the reaction occurs at a temperature in the range from 130° C. to 170° C. and at a pressure in the range from 2 bar to 13 bar; and a molar ratio between the 3,5-dimethylaniline and the perylene-3,4,9,10-tetracarboxylic dianhydride ranges from 2:1 to 3:1.

12. The process of claim 7, wherein the primary amine mixture comprises greater than 0% of the primary amine.

13. The process of claim 11, wherein the primary amine mixture comprises greater than 0% of the primary amine.

14. The process of claim 1, wherein the Pigment Red 149 is obtained as a crude product in greater than 94% yield after a resulting reaction mixture is filtered and washed, and before any additional purification.

* * * * *

UNITED STATES PATENT AND TRADEMARK OFFICE
CERTIFICATE OF CORRECTION

PATENT NO. : 10,287,435 B2
APPLICATION NO. : 12/527706
DATED : May 14, 2019
INVENTOR(S) : Heinrich Kowarsch et al.

Page 1 of 1

It is certified that error appears in the above-identified patent and that said Letters Patent is hereby corrected as shown below:

On the Title Page

Column 2, item (56), other publications, Line 8, "2009," should read -- 2009, 6, --

In the Specification

Column 2, Line 45, "tetracarbcoxylic" should read -- tetracarboxylic --

Column 3, Line 14, "N-methyimidazole" should read -- N-methylimidazole --

In the Claims

Column 6, Line 5, Claim 8, "imethylphenyl" should read -- dimethylphenyl --

Signed and Sealed this
Twenty-first Day of April, 2020

Andrei Iancu
*Director of the United States Patent and Trademark Office*